(12) United States Patent
Peterson et al.

(10) Patent No.: US 7,933,068 B2
(45) Date of Patent: Apr. 26, 2011

(54) RECONFIGURABLE PROJECTION-SCREEN SYSTEM

(75) Inventors: Mark David Peterson, Lake Oswego, OR (US); T. Scott Engle, Beaverton, OR (US)

(73) Assignee: Seiko Epson Corporation, Nagano-Ken (JP)

( * ) Notice: Subject to any disclaimer, the term of this patent is extended or adjusted under 35 U.S.C. 154(b) by 1079 days.

(21) Appl. No.: 11/537,966

(22) Filed: Oct. 2, 2006

(65) Prior Publication Data

US 2007/0153375 A1 Jul. 5, 2007

Related U.S. Application Data

(60) Provisional application No. 60/722,460, filed on Sep. 30, 2005.

(51) Int. Cl.
*G03B 21/56* (2006.01)
(52) U.S. Cl. ...................................... 359/443
(58) Field of Classification Search .................. 359/443, 359/461; 160/21, 372
See application file for complete search history.

(56) References Cited

U.S. PATENT DOCUMENTS

| | | | |
|---|---|---|---|
| 3,120,865 A | | 2/1964 | Ciofani et al. |
| 4,017,152 A | * | 4/1977 | Allen ............................ 359/443 |
| 4,106,852 A | * | 8/1978 | Chasins ......................... 359/443 |
| 4,110,003 A | | 8/1978 | Zinn |
| 5,510,862 A | | 4/1996 | Lieberman et al. |
| 6,466,369 B1 | * | 10/2002 | Maddock ....................... 359/460 |
| 6,474,021 B2 | * | 11/2002 | Homeyer ....................... 160/372 |
| 6,785,047 B1 | * | 8/2004 | Risher ............................ 359/443 |
| 6,870,672 B2 | * | 3/2005 | Stumpfl ......................... 359/443 |
| 7,397,603 B2 | * | 7/2008 | Peterson et al. ............... 359/443 |
| 7,446,937 B2 | * | 11/2008 | Poretskin ...................... 359/443 |
| 2006/0077356 A1 | * | 4/2006 | Merczak ........................ 353/79 |
| 2008/0030853 A1 | * | 2/2008 | Creel ............................. 359/461 |
| 2008/0094698 A1 | * | 4/2008 | Enochs .......................... 359/443 |

FOREIGN PATENT DOCUMENTS

WO WO 03/104888 12/2003

\* cited by examiner

*Primary Examiner* — Christopher Mahoney
(74) *Attorney, Agent, or Firm* — Kilpatrick Townsend & Stockton LLP

(57) ABSTRACT

A reconfigurable projection-screen system. The projection-screen system includes a flexible screen and a frame assembly. The flexible screen includes a screen perimeter and a viewing region interior the screen perimeter. The frame assembly includes a plurality of frame members, where at least some of the plurality of frame members include a screen perimeter engaging portion. The plurality of frame members are selectively arrangeable in at least an assembled viewing configuration and a disassembled configuration. In the assembled viewing configuration the plurality of screen perimeter engaging portions extend the screen perimeter and hold the viewing region substantially flat. In the disassembled configuration the plurality of screen perimeter engaging portions allow the viewing region to fold.

23 Claims, 7 Drawing Sheets

Fig. 1
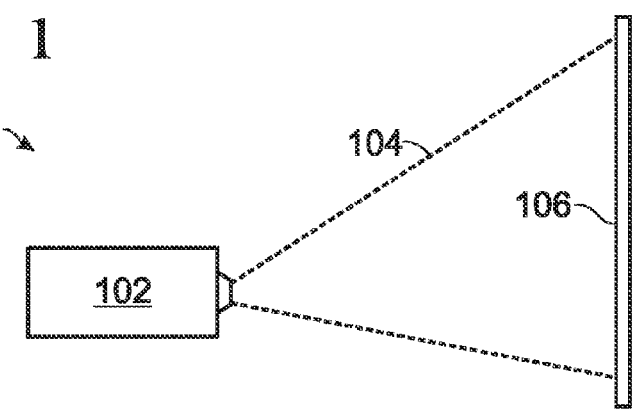
Fig. 2
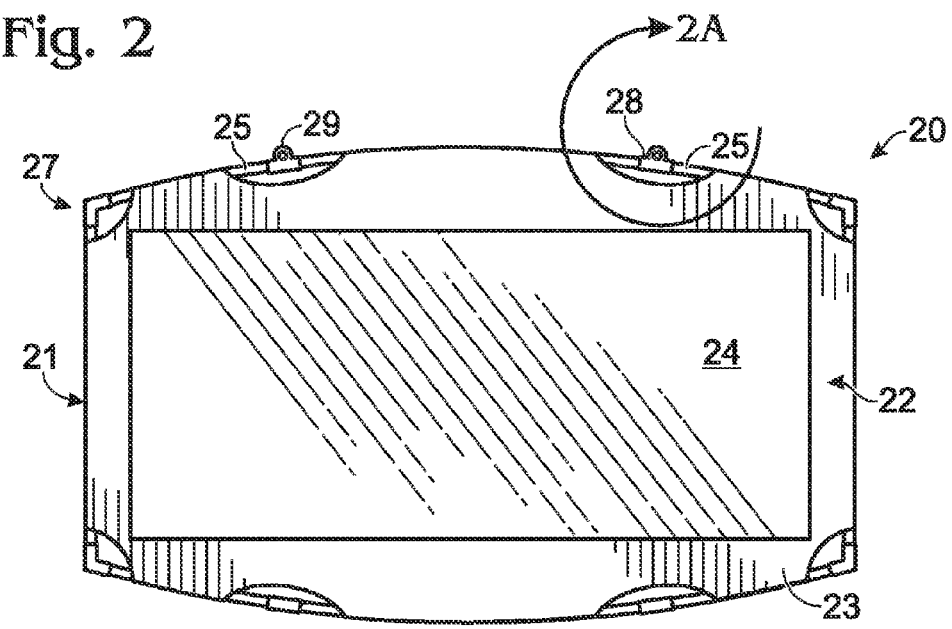
Fig. 2A
Fig. 3
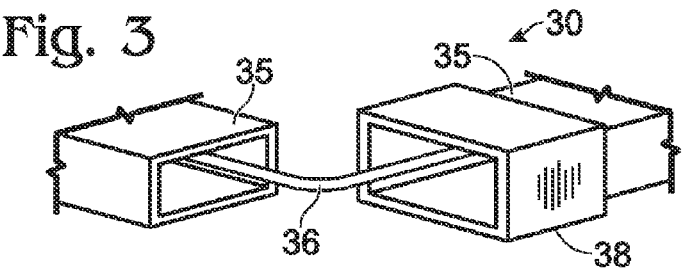

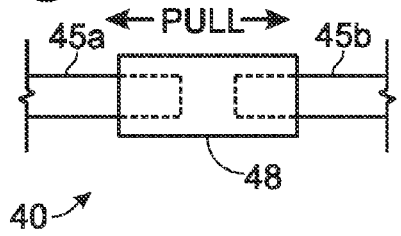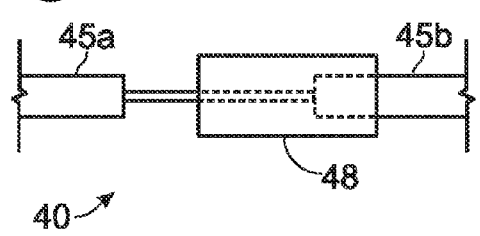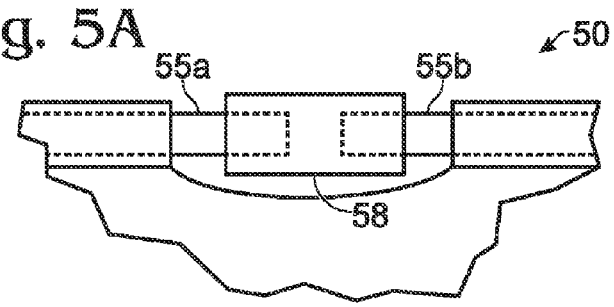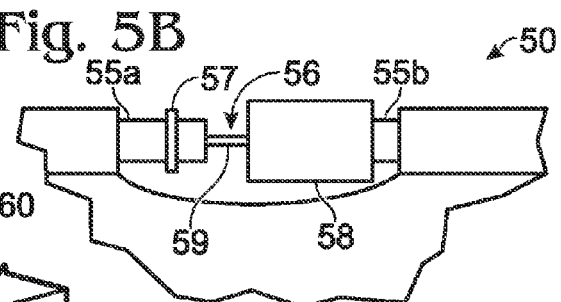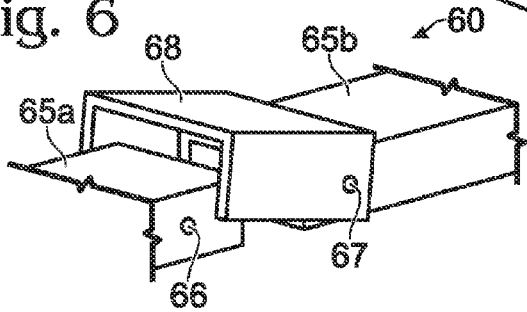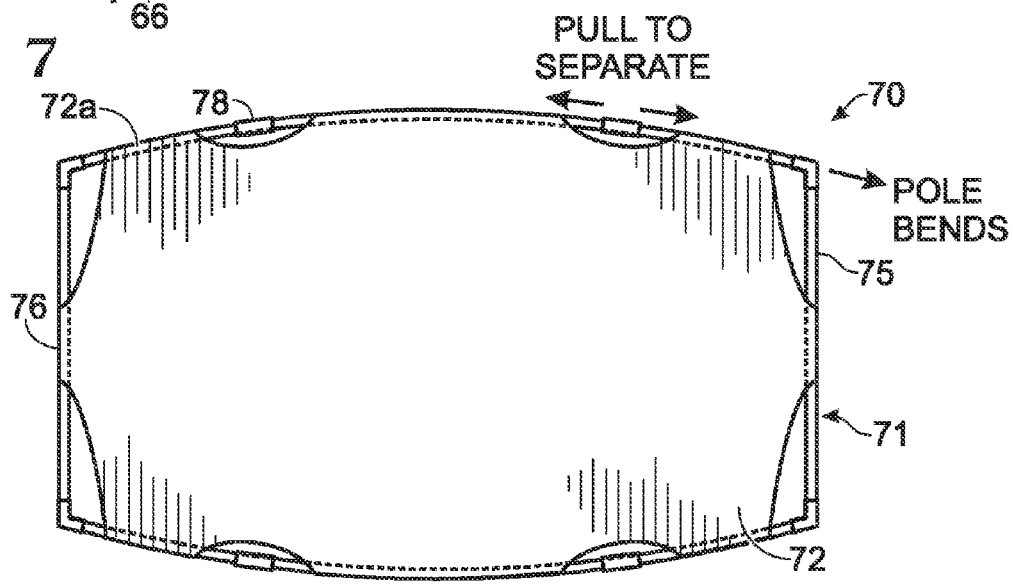

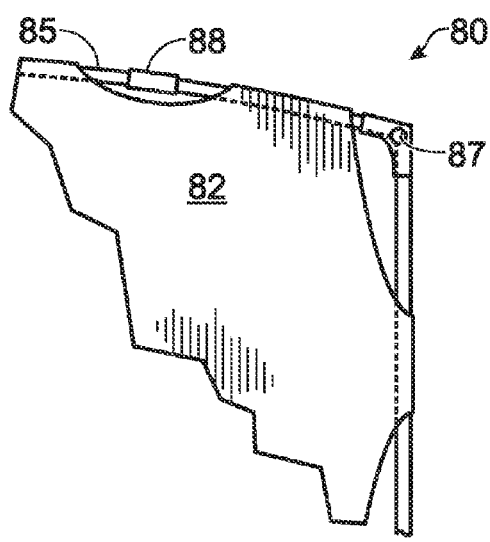
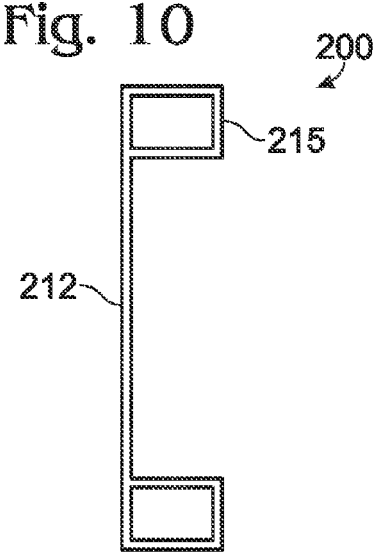
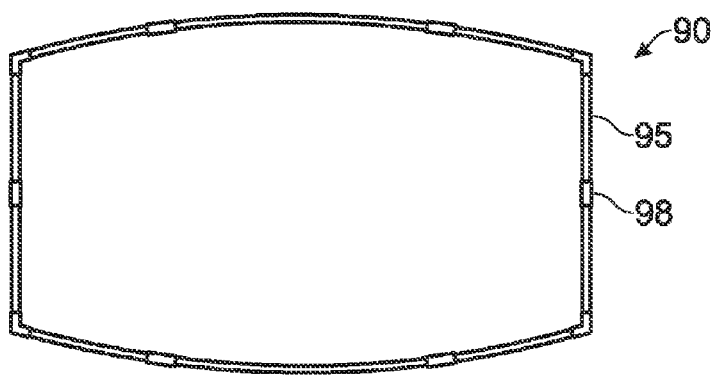
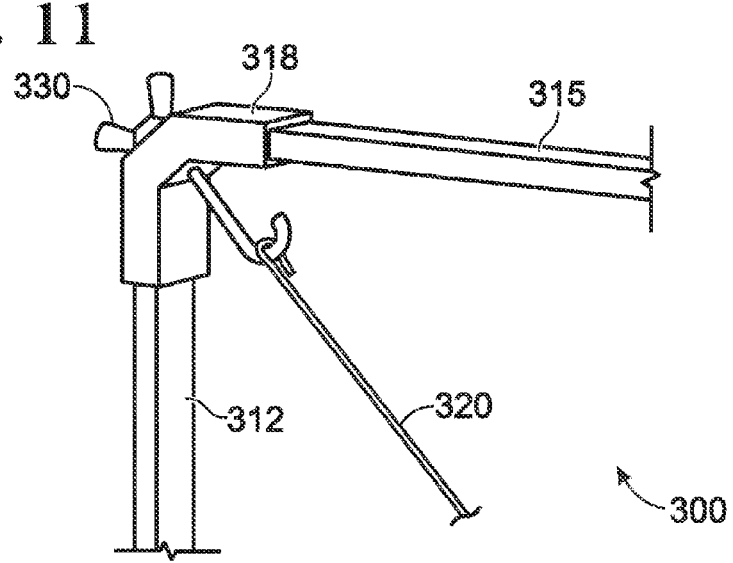

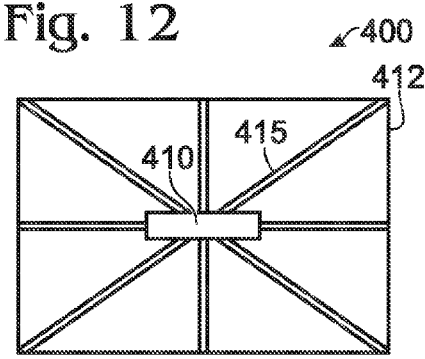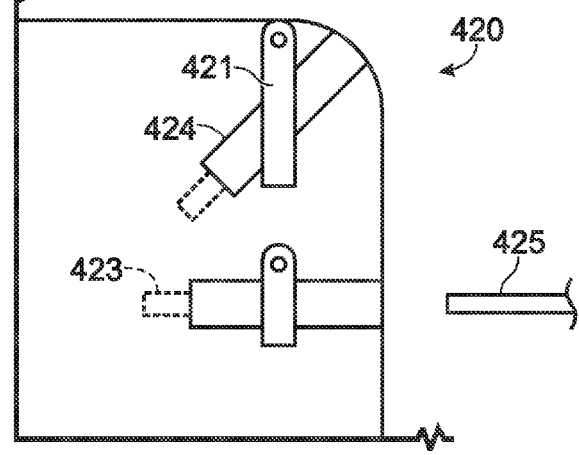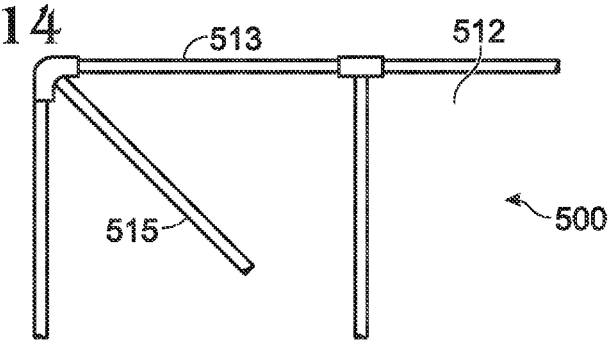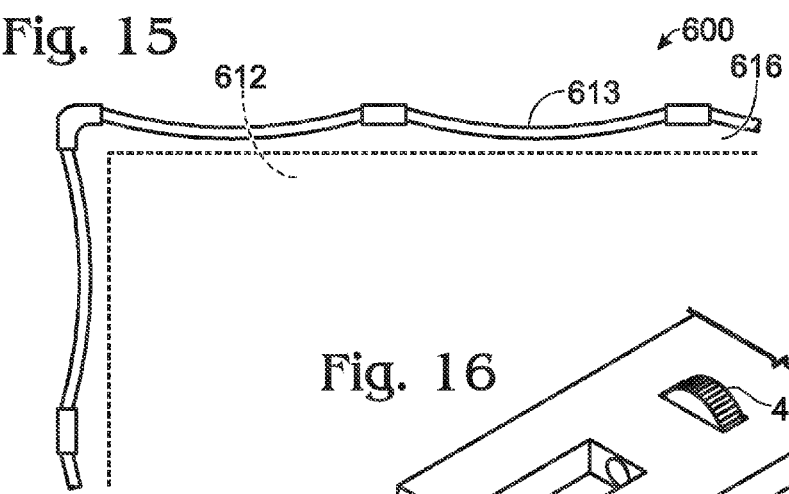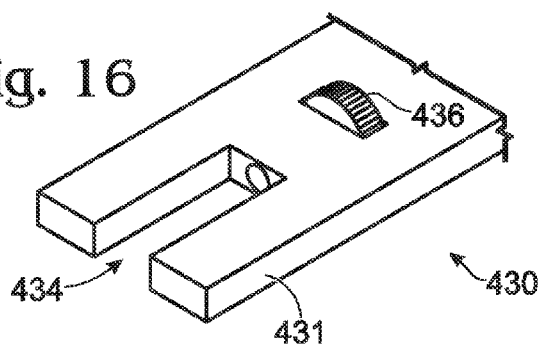

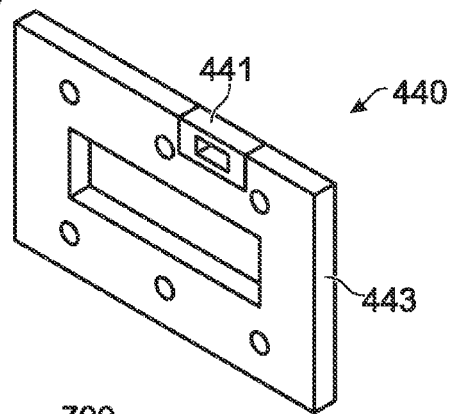
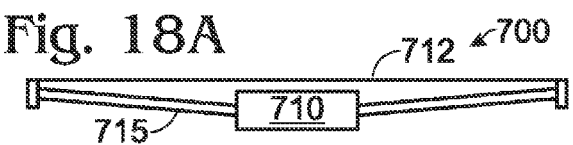
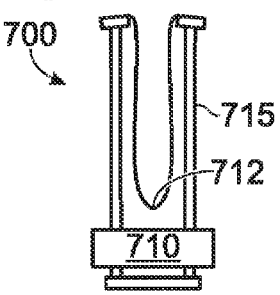
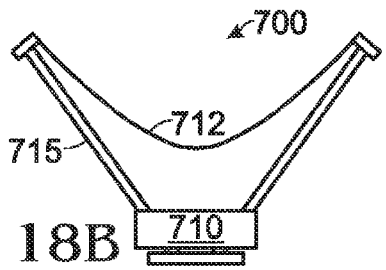
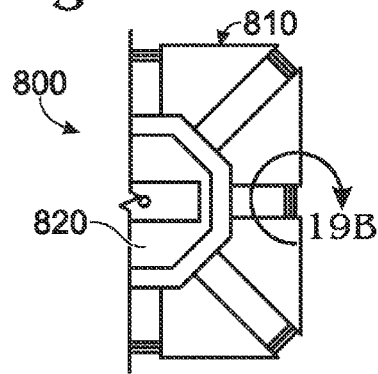
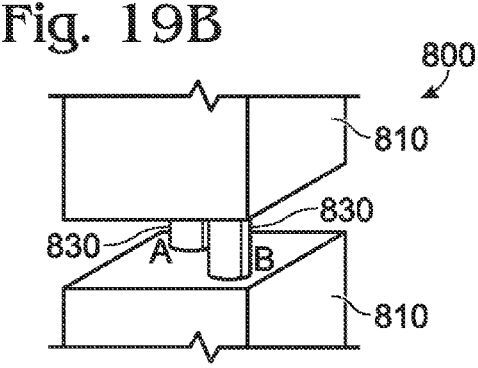

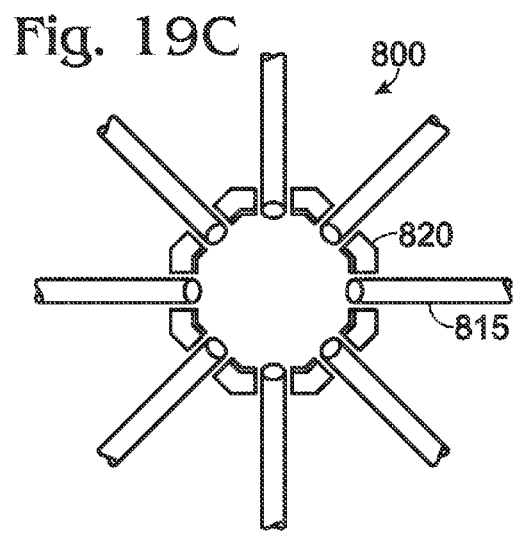
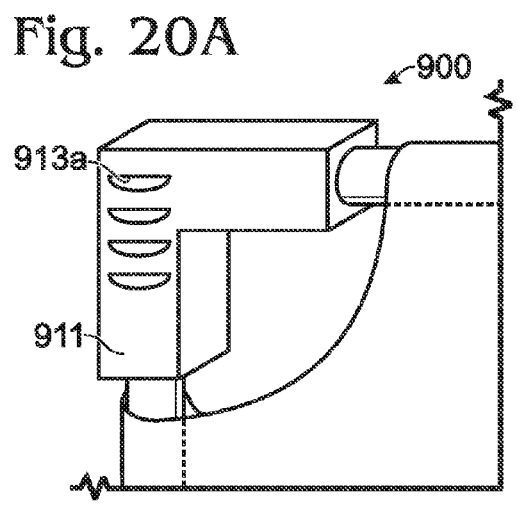
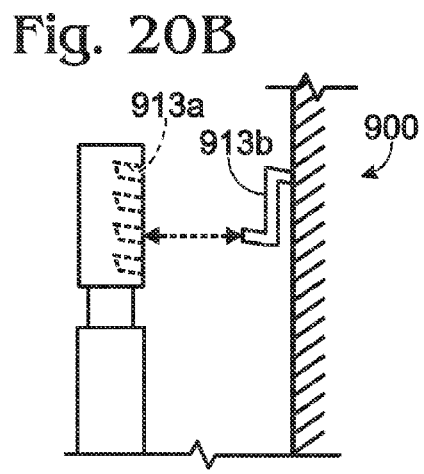
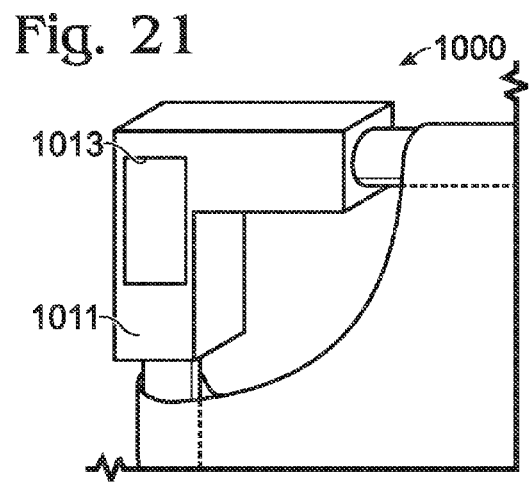
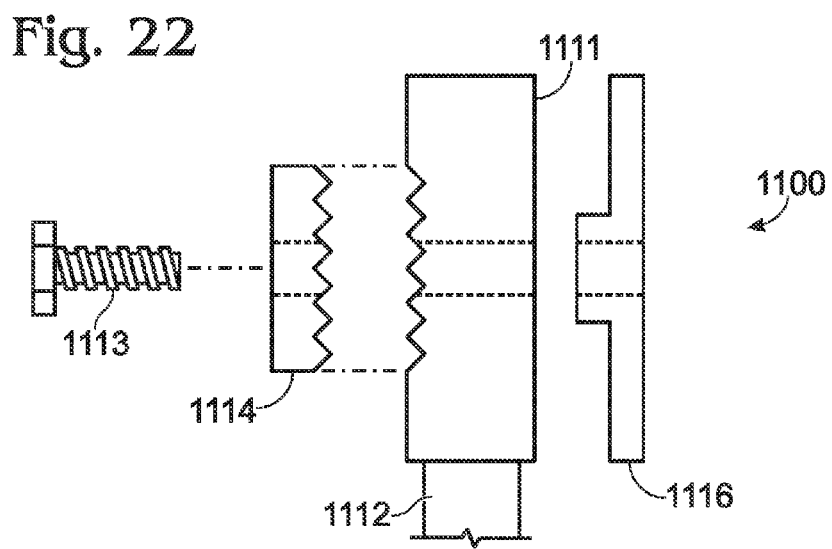

RECONFIGURABLE PROJECTION-SCREEN SYSTEM

CROSS REFERENCE TO RELATED APPLICATIONS

This application claims the benefit of U.S. Provisional Application No. 60/722,460, filed Sep. 30, 2005, the entirety of which is hereby incorporated herein by reference for all purposes.

BACKGROUND AND SUMMARY

Projection screens are used with projectors to present visual information to one or more viewers. In particular, relatively large projection screens can be used to present information to a relatively large number of viewers at the same time. Even when not necessary to accommodate a large group, viewers often appreciate relatively large projection screens.

However, storing and transporting large projection screens can raise many issues. The large size and awkward shape of projection screens makes them difficult to easily transport. Some known solutions attempt to mitigate these issues by rolling a projection screen, which allows one dimension of the projection screen to be reduced. The inventors herein have recognized that such a solution is of limited value, because a rolled projection screen remains substantially large in the dimension that is parallel with the axis of rolling. Furthermore, when unrolled, the projection screen may not be sufficiently tensioned to provide a desired viewing experience.

Accordingly, a projection-screen system is provided that allows a screen to be selectively folded and extended. In some embodiments, the screen can be folded in two or more dimensions (i.e., the height and width of the projection screen can be reduced). In some embodiments, a perimeter of the screen can be tensioned, thus helping hold the screen substantially flat.

BRIEF DESCRIPTION OF THE DRAWINGS

FIG. 1 shows an exemplary display system.

FIG. 2 shows an exemplary embodiment of a screen assembly.

FIG. 2A shows a segment of the screen assembly of FIG. 2.

FIG. 3 illustrates another segment of an embodiment of a frame.

FIG. 4A illustrates a segment of an embodiment of a frame.

FIG. 4B illustrates the segment of the frame of FIG. 4A after frame components are disassembled.

FIG. 5A illustrates a segment of another embodiment of a frame.

FIG. 5B illustrates a segment of the frame of FIG. 5A after frame components are disassembled.

FIG. 6 illustrates a segment of another embodiment of a frame.

FIG. 7 illustrates another embodiment of a screen assembly.

FIG. 8 illustrates another embodiment of a screen assembly.

FIG. 9 illustrates another embodiment of a screen assembly.

FIG. 10 shows a cross sectional view of an exemplary embodiment of a screen assembly.

FIG. 11 shows a three-dimensional view of an exemplary screen assembly.

FIG. 12 shows an exemplary embodiment of a radially extending screen assembly.

FIG. 13 schematically shows engagement of a hub and spoke for a frame.

FIG. 14 is a schematic view of an embodiment of a screen assembly having a rigid perimeter.

FIG. 15 is a schematic view of an embodiment of a screen assembly with a flexible perimeter.

FIG. 16 illustrates an embodiment of a hub and spoke design that can adjust the tension of a screen assembly.

FIG. 17 shows an exemplary mechanism having a level indicator.

FIGS. 18A, 18B, and 18C are schematic views of a screen assembly having a self-assembly feature.

FIGS. 19A, 19B, and 19C show a frame assembly including a hub joint and radially extending spanners.

FIGS. 20A and 20B illustrate an exemplary mechanism to mount a screen assembly to a wall.

FIG. 21 shows another exemplary mechanism to mount a screen assembly to a wall.

FIG. 22 illustrates another exemplary mechanism to mount a screen assembly to a wall.

WRITTEN DESCRIPTION

Figure 23A:
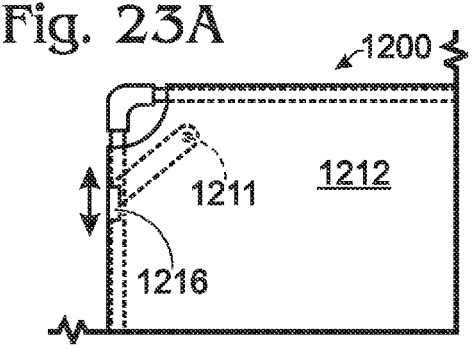
FIGS. 23A and 23B illustrate an exemplary mechanism that holds a screen by the vertical edge.

An image display system may be configured to generate an image on a display surface for viewing by a viewer. FIG. 1 provides a schematic illustration at 100 of an exemplary display system. For example, display system 100 may include a display device, such as a projector 102. Projector 102 may be any suitable type of projection device, including, but not limited to, a digital projector, a liquid crystal display (LCD) projector, a digital light processing projector, a rear projector, a rear projection television, a front projector, etc.

Projector 102 may project or display an image (indicated at 104) to display surface 106. Display surface 106 may be a screen, a screen assembly, or other suitable surface configured to reflect, transmit, or otherwise display the projected image and direct the image displayed by projector 102 toward a viewer.

FIG. 2 is a schematic view of an exemplary embodiment of a screen assembly 20, including a screen 22 and a structural support or frame 21. Screen 22 may be mounted on a structural support or frame 21. Screen 22 may have multiple components such as white screen 24 and black mask 23. In the embodiment shown in FIG. 2, frame 21 includes frame components 25, such as poles or other supports, and one or more joints 28. The frame components that form the frame may be similar to poles used for pop-up tents. Such frame members may be referred to as elongated spanners, because they span the distance between joints when the screen is in an assembled viewing configuration. Joints 28 may be selectively detachable to enable selective sizing of the frame. In one example, joints 28 may be dissembled to reduce the size of the frame. By arranging the number of disassembly joints, screen assembly 20 may be folded into a desirable compact package. The size of the package may depend on the number of connections in the screen assembly and the number of times it is folded. As used herein, "folded" may be used to refer to virtually any substantial nonflattening of the screen, which can be achieved by bending or laying the screen so that one part overlaps another part, rolling the screen, crumpling the screen, or otherwise substantially reducing the largest dimension of the screen.

Typically, it is difficult and costly to transport a screen for projection devices because screens are large in two dimensions and small in one dimension. For example, the length and width of the screen may be of significant size while the depth of the screen may be substantially smaller. A long thin box that most screens are shipped in may be vulnerable to bending. Thus, the screen may be damaged during the transportation and may be difficult to store.

Also, it may be difficult to display current screens for sale in conventional stores. For example, screens may not be placed on the shelf beside the projection devices for sale because of the size of the screens.

Further, known screen may be configured to roll into a storage or non-use position. Rolling the screen may cause twisting of the screen material. In addition, conventional foldable screens are not flat enough and may create severe distortions in the image.

The collapsible screen assembly of the present disclosure allows a user to compactly store the screen into a desirable package for transportation and for sale beside the projection device. Further, a collapsible screen assembly may be shipped in a roughly cubical and/or relatively small box and may be easily transported. Furthermore, assembling and disassembling the screen assembly of the present disclosure may be easy compared to the conventional foldable screen. Moreover, the screen assembly may be inexpensive.

Referring now to an embodiment of the present invention, the collapsible screen assembly may include a frame having a plurality of frame components, such as poles. Frame components of a frame may be connected by various coupling mechanisms. FIG. 3 illustrates one segment 30 of a frame with Disassembly joint 38 and frame components 35. Disassembly joint 38 may couple frame components 35 by any detachable mechanisms such as a locking and mating mechanism, a screw mechanism, a clamp mechanism, a snap-fit mechanism, etc. FIG. 3 shows that frame components 35 are connected through disassembly joint 38 by inserting one end of frame components 35 into disassembly joint 38. For example, one frame component may have a female coupler while a second receiving frame component may have a mating male coupler.

Alternatively and/or additionally, for ease of assembly and disassembly, frame components 35 may be attached to each other with a connector, such as an elongated flexible connector 36. The flexible connector may include, but is not limited to, elastic cord, strap, string, etc. In some embodiments, the flexible connector 36 may pass through a hollow portion of the frame component such as the center of frame components 35, as illustrated in FIG. 3, or via another region of the frame components. Alternatively, the flexible connector 36 may be attached to a portion of the outside of frame components 35 to connect or couple the frame components. In other embodiments, the flexible connector may be a biased connector such that the frame components are biased in an assembled configuration. The configurations using the flexible connector couple the frame components by applying compressive force to the joints. In some embodiments, frame components may be self-assembling due to this compression force and the use of the flexible connector.

In some embodiments, one or joints may be configured differently than one or more other joints. For example, the corner of a frame may have a different configuration then the side frame components. In the embodiment illustrated in FIG. 2, one disassembly joint is used at a corner 27. Disassembly joints 38 at the corner 27 may be configured to form an angle of substantially 90 degrees to receive one frame component in the substantially horizontal direction and another frame component in the substantially vertical direction. Alternatively, two disassembly joints may be used at a corner. Yet in another embodiment, the frame component at the corner may be configured to have an angle of substantially 90 degrees so that it can be connected to one frame component in the horizontal direction and another frame component in the vertical direction. In this embodiment, separate joints may not be required.

FIGS. 4A and 4B illustrate a mechanism for assembling and disassembling a frame. FIG. 4A shows a segment 40 of an embodiment of a frame. In the embodiment illustrated in FIG. 4A, the frame may be broken down by simply pulling frame components 45 apart so that they separate at the joint. In some embodiments, both frame components 45*a* and 45*b* may be separated from disassembly joint 48 such as shown in FIG. 4A. Alternatively, one segment of frame component, such as frame component 45*b*, may be permanently attached to the disassembly joint 48 as shown by FIG. 4B.

FIGS. 5A and 5B illustrate another mechanism for assembling and disassembling a segment 50 of a screen assembly. FIG. 5A shows that two frame components may be coupled together through disassembly joint 58. In the embodiment illustrated in FIG. 5B, one end of frame component 55*a* has a protrusion or extension 57. The protrusion 57 may be a flange along the perimeter of frame component 55*a*. Alternatively, protrusion 57 may be disposed at selected portions along the perimeter of frame component 55. In the embodiment illustrated in FIG. 5B, a sliding of disassembly joint 58 to one side will reveal gap 56 in the poles, which allows the frame to be disassembled or folded. Thus, as frame component 55*b* is slid away from protrusion 57, a flexible connector 59 may enable frame component 55*a* to collapse and be decoupled from frame component 55*b*.

FIG. 6 illustrates yet another mechanism for assembling and disassembling a segment 60 of a screen assembly. Frame components 65*a* and 65*b* may be connected by a coupling member 68. Coupling member 68 may be any suitable coupling mechanism, including but not limited to a clasp, a sleeve, a locking clamp, etc. Coupling member 68 may be attached to one end of frame component 65*b* at hinge point 67. In another embodiment, detent 66 may be disposed on frame component 65*a* to improve the locking of the coupling member and thus the connection between frame components 65*a* and 65*b*. When coupling member 68 is lifted, frame components 65*a* and 65*b* may be separated.

It should be appreciated that any mechanism that can couple two frame components during assembly and allow components to be separated during disassembly may be used for the collapsible frame. For example, if frame components are round poles, one end of the pole may have threads so that it can be screwed into another pole having matching threads. In this embodiment, poles may be connected directly with each other, thus eliminating the need for disassembly joints described above.

Frame components may be any suitable size or shape. For example, frame components may be hollow or solid. The cross section of frame components may be rectangular, square, round, oval, C-shaped, etc. Further, frame components may be rectangular tubes, square tubes, round tubes, etc.

The frame components may include any materials suitable for coupling frame components with disassembly joints or coupling frame components with frame components. Examples include, but are not limited to, fiberglass, carbon-fiber, aluminum, plastic, etc.

As discussed above, a screen assembly may include a frame and a screen. The screen may be composed of a variety of screen materials, including but not limited to flexible materials such as fabrics, plastics, etc. The screen material may be attached to the frame in various ways. FIG. 7 shows an embodiment of screen assembly 70. In this embodiment, frame 71 includes frame components 75 and disassembly joints 78. Screen material 72 may be attached to frame 71 permanently with pocket 72a having frame component 75 threaded through. Alternatively, screen material may be attached to the frame temporarily with a removable or detachable fastener, such as a hook or clip. In some embodiments, pockets may enclose one or more of the joints.

Various portions of the screen may be attached to the frame. In one embodiment, the screen material may be coupled such that it is spaced from the corners as shown by FIGS. 2 and 7. Screen material may be attached at an attachment point 76 such as a center region of the vertical frame component as illustrated by FIG. 7. As shown, only small portion of the screen is attached to the center of the vertical frame component. Alternatively, portions of the screen material may be attached at multiple attachment points along the frame component. Moreover, a section of the screen material may have relatively little area near the frame, as shown along the horizontal frame component in FIG. 7.

In yet another embodiment illustrated by FIG. 8, screen material 82 is clipped to the corner by snap 87 once it is assembled. Snap 87 will release during disassembly so that a space is available to enable disassembling of the frame. Screen assembly 80 as shown in FIG. 8 includes frame component 85 and disassembly joints 88. Similarly, screen material may be clipped to other parts of the frame if it is desirable to hide disassembly joints.

In yet another embodiment, the edge portion of a screen may include a stiff portion that stands against gravity by itself. For example, the edge portion of a screen may be made of materials that are thicker or heavier than the material at the center regions of the screen. In some embodiment, the edge of a screen may be the same material as that used for the center region but may have more layers than the center region. In other embodiments, the material used for the edge of a screen may be different from and stiffer than the material used for the center region.

FIG. 7 illustrates a method of disassembling frame components. The frame components may be pulled apart as indicated by the arrows. In the illustrated embodiment, the screen material may be moved away from the corners to allow the frame components to bend and thus preventing stretch of the screen material. In another embodiment, spaces may be needed to separate the joints of a frame. A screen that includes at least some stretchy material is a nonlimiting example of a screen that may facilitate separating the joints of a frame.

Screen assemblies according to the present disclosure may be configured to facilitate screen flatness and thus limit image distortion. One suitable configuration is to have frame components that are bias the frame in a flat orientation. For example, shaped frame components such as rectangular or square poles may orientate the screen to prevent the screen from warping out of a flat plane.

In another example, shaped frame components, such as round poles, may be augmented with additional structure that facilitates a desired screen flatness. For example, rectangular or square shaped parts may be mounted at select points along round poles of a frame to orientate the screen to maintain a flat plane. In yet another example, selected disassembly joints may be made of rectangular or square shapes and may be disposed inside the screen material so that they will keep the screen in a desired orientation.

A frame can additionally or alternatively be configured to apply tension to the screen material so that the screen remains flat and free of wrinkles. A nonlimiting example of applying tension may be achieved by making one or more sides bow out away from the center of the screen. As an example, FIG. 9 illustrates frame 90, which includes frame components 95 and disassembly joints 98, which are configured so that the top and bottom sides of the screen bow out away from the center of the screen. The frame members and joints can be biased toward a straight disposition, so that when the sides are bowed as in FIG. 9, they will stretch the screen while trying to return to their straight configuration. The tension caused by such a configuration is indicated by arrows in FIG. 9. The tension may help maintain the screen in a flat plane.

Furthermore, screen flatness may be improved through adjustment of the frame by a user. For example, a tension cord may be positioned at one or more corners of a frame. In some embodiments, a diagonal tension cord may be attached from opposite corners to tighten one or more edges of the screen. By tightening the tension cord, increased tension may be applied across the frame and thus help flatten the screen.

FIG. 10 shows a cross sectional view of an embodiment of a screen assembly 200. The screen material 212 is attached towards the front edge of the frame components 215.

FIG. 11 shows a three dimensional view of screen assembly 300. In some embodiments, the screen may be biased so two corners are closer to the viewer than the average plane of the screen. The user may adjust the tension of the cord to pull the screen into flatness. For example, tension adjuster 330 may be used to adjust tension cord 320 to achieve desired flatness. FIG. 11 also shows disassembly joints 318 and frame components 315.

In addition, in some embodiments, coupling material may be used to attach the screen assembly to a wall or other surface. As the frame components and screen create a very light screen, materials, such as hook and loop materials (e.g. VELCRO™), may be used to affix the screen assembly to a wall. The coupling material may be positioned in the corners of the screen such that the screen is taut when hung. The hanging and slight stretch of the screen when mounted may result in a substantially flat screen. Other mounting devices can be used without departing from the scope of this disclosure.

Maintaining the screen in a substantially flat orientation may be desired with projection devices, including short throw projection devices. Conventional foldable screens may not be flat enough to avoid creating severe distortions in the image. Screen assemblies of the present disclosure use one or more of frame shape, frame configuration, joint configuration, adjusting mechanisms, and other disclosed features to maintain a desirable flatness for the screen.

In yet another embodiment, a screen assembly may be provided with a support that spreads across the surface of the screen. For example, FIG. 12 shows a screen assembly 400 having screen 412 supported by frame components extending across the non-viewing surface of a screen. In some embodiments, frame components may be spokes 415. In the illustrated embodiment, spokes 415 are inserted into a central hub 410. Each spoke 415 may be a single frame component such as a pole. Alternatively, each spoke may include one or more frame components so that the spokes may be broken into smaller sections for storage and shipping.

In the hub and spoke design, the spokes may be rigidly engaged into the central hub 410. There are various ways to engage the spokes into the hub 410. For example, the hub may include spoke receivers, such as holes or slots into which the spokes may be inserted. In another example, the hub may be configured to have at least two widely spaced points for holding the spokes. Other structures may be provided at the hub to enable coupling of the spokes, including detent structure, lock structure, clamping structure, screws, tabs that fit into cavities in the spokes, etc. The spokes may extend from the hub to the perimeter edge of the screen. For example, four spokes may extend from the hub to each of the respective corners of the screens. In other embodiments, more or less spokes may be used, and such spokes may extend from the hub to the perimeter of the screen or to some other desired point to support the screen.

FIG. 13 illustrates an exemplary embodiment of spoke to hub engagement. The hub 420 has slots 424 for the spokes 425. The spokes are inserted into a shallow hole 423 in the hub 420. In some embodiments, a retainer flap 421 may be used to further secure spokes 425 to provide rigidity.

It should be appreciated that other frame structures may provide support to a screen across the non-viewing surface of the screen. For example, a frame may include one or more horizontal frame components and one or more vertical frame components. The vertical frame component(s) can be connected with the horizontal frame component(s) at one or more points. Alternatively, a frame may include frame components disposed in different directions and detachably connected.

FIG. 14 is a schematic view of an embodiment of a screen assembly 500 with rigid perimeter 513 and frame components 515. Perimeter 513 of screen 512 may be rigid with the use of additional frame components such as poles along the edge of screen 512. In some embodiments, these poles are permanently attached to the screen, which may or may not be permanently attached to the spokes and hub. In another embodiment, the poles may be selectively added after the main support structure such as spoke and hub design is assembled. Alternatively, the edge of the screen may be made of stiff materials that make a rigid perimeter.

The perimeter of the screen may also be flexible. FIG. 15 is a schematic view of an embodiment of a screen assembly 600 with flexible perimeter 613. An elongated flexible part such as an elastic cord or similar materials may be attached to the screen to provide a flexible edge, and the actual screen material may be shaped in such a way that when connected to the flexible part the flexible part is held in an extended state. In this way, the flexible part is selectively tensioned to maintain the screen in a flat orientation. For example, the elastic cord can add tension to the screen to keep the surface flat and free of wrinkles. In the embodiment illustrated in FIG. 15, the screen has a parabolic shape between each end of the frame components. When the shape of a screen is known, a dark colored fabric 616 such as black fabric may be used for the edge material in such a way as to create a desired shape of the white screen surface 612. The white surface may be rectangular with straight edges as shown in FIG. 15 while the screen perimeter has parabolic edges.

The tension of a screen assembly having a hub and spoke design may be adjusted so as to flatten the screen. For example, in some embodiments, the screen may be flattened by adjusting the length of one of the corner spokes. In some embodiments, only one of the four corner spokes needs an adjustment, as moving one spoke will either tighten or loosen the diagonal spokes. FIG. 16 shows a mechanism 430 that facilitates adjustment of screen tension. In the illustrated embodiment, a thumb wheel 436 is mounted in the hub 431. A spoke may be inserted into slot 434. The tension adjustment can be done through thumb wheel 436 that pushes or pulls the spoke toward the corner by adjusting how deeply the spoke is seated into the hub 431.

In some embodiments, a screen assembly may include a mechanism to indicate the level such as the horizontal, vertical and/or tilt level of the screen relative to the hanging place or support surface. For example, it may be desirable to mount the hub or other mounting structure of a screen assembly with a level orientation. To aid in the mounting and to obtain the desired level, a bubble level or similar mechanism may be built into the screen assembly to make the level adjustment easy during installation. FIG. 17 shows an exemplary mechanism 440 having a level indicator. In some embodiments, a bubble level 441 may be built into a mounting structure such as wall bracket 443. Alternatively, a bubble level or similar mechanisms may be built into selected frame components or disassembly joints described above to indicate level of the screen.

In some embodiments, the screen assembly may be capable of substantially self-assembly and/or self-disassembly. For example, a screen assembly of a hub and spoke design may be capable to be self-assemble, i.e., the spokes may fold together and the screen material may collapse into the center of the spokes. FIGS. 18A, 18B, and 18C show a mechanism of a self-assembly and/or self-disassembly screen assembly 700. In FIG. 18A, a portion of a screen assembly having a hub 710 and spokes 715 is shown to support screen 712. In some embodiments, the spokes 715 may be mounted to a central connector 720 such as a ring connector. Central connector 720 may be locked into hub 710 when screen 712 is in use, which will keep the screen fabric tight as shown in FIG. 18A. When central connector 720 is released from hub 710, spokes 715 may collapse together. As such, the spokes may collapse in a similar fashion as an umbrella.

FIGS. 19A, 19B, and 19C show an exemplary self-assembly screen assembly 800. The screen assembly 800 includes hub 810, spokes 815, spoke retainers 830 at point A and point B and central connector 820. As an example, a spoke 815 may be disposed between points A and B. Release and collapse of the screen may result from the spoke contacting one of points A and B. For example, in FIGS. 19A and 19B, pulling the central connector 820 away from hub 810 may result in pushing spokes 815 against retainer 830 at point A. Contact with point A may result in collapse of the spokes. On the other hand, pushing central connector 820 towards the hub pushes spokes 815 against retainer 830 at point B and may force the spokes to extend into an expanded position. It should be appreciated that points A and B may be reversed or combined into a single release and/or expansion point. FIG. 19C schematically shows the spokes in position to engage the hub joint, without fully showing the hub joint.

The collapsible screen assembly of the present disclosure may be very light in weight. In some embodiments, the weight of the screen assembly may be less than two pounds. The relatively low weight of a screen assembly makes it easy to be mounted to a fixed place. For example, in some embodiments, a screen assembly may be mounted to a surface by a hanging mechanism. In other embodiments, a screen assembly may be mounted by attaching a hub of a hub spoke frame to a surface.

A screen assembly may be mounted to a fixed place by various mechanisms. FIG. 2A shows a screen assembly with a hanging mechanism including a plurality of loops located at joints of the frame assembly. In the embodiment illustrated in FIG. 2A, the disassembly joints 28 are not covered with screen material 22. Loop 29 allows screen assembly 20 to be hung to a wall or other substantially vertical surface.

The screen may be mounted on the wall with some adjustability to allow for creating a level screen. For example, the screen may be mounted by hanging or attachment mechanisms such as hooks, similar to those used for hanging pictures. In some embodiments, the hooks may engage the corners of the screen in multiple locations, thus giving the user some adjustability to obtain a desired screen level. For example, a mounting mechanism 900 is shown generally in FIG. 20A where corner 911 of a screen assembly has multiple slots 913*a* that may engage a projection 913*b* (shown in FIG. 20B) which is coupled to a wall. The projection 913*b* may be a hook, a bolt, etc. FIG. 20B is a cross sectional view showing alignment of slot 913*a* with projection 913*b*.

Alternatively, the corners of the screen may include an opening such as a slot through which a projection may pass. The projection may attach to a bracket that is attached to the wall or other surfaces. FIG. 21 shows that corner 1011 of screen assembly 1000 has an opening such as slot 1013. In some embodiments, a projection, such as a bolt, may pass through slot 1013 so that the screen assembly 1000 may be mounted to a wall. Slot 1013 may be an elongated opening in the vertical direction as shown in FIG. 21. Alternatively, the slot may be an elongated opening in the horizontal direction, or the slot may have a diagonal or irregular shape. The slot may enable user adjustment of screen position and level.

In some embodiments, a screen attachment mechanism may include a non-slip surface. FIG. 22 shows an exemplary screen attachment mechanism at 1100. Washer 1114 may be provided with serrations that may mate with similar features molded into corner brace 1111 of screen assembly 1112. The serrations may provide a positive, non-slip surface when bolt 1113 is tightened to the wall by passing through washer 1114, corner brace 1111, and wall bracket 1116. In some embodiments, wall bracket 1116 may have serrations that match the serrations on the corner brace 1111 so as to provide the non-slip surface. Other components, including frame components, may also be provided with the non-slip surface mounting features.

It should be appreciated that the screen may also be mounted to a wall through engaging parts of a screen assembly other than the corner of the screen assembly. For example, the disassembly joints 28 as shown in FIG. 2 may have slots to engage with hooks or bolts that are coupled onto the wall.

Figure 23B:
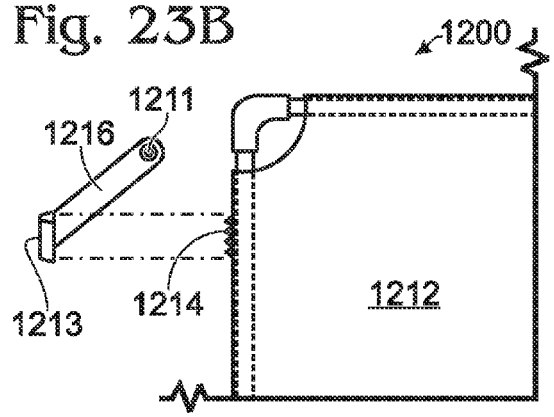

In some embodiments, the screen assembly may be held by the vertical edge of the screen. For example, FIGS. 23A and 23B show a clamp 1216 that holds the vertical side of the screen. Clamp 1216 may be mounted to a wall so that it can rotate around a single mounting point 1211. Side clip 1213 of clamp 1216 may be configured to grab the one or more sides or corners of screen 1212. Clamp 1216 may be secured with downward pressure or weight of the screen. In the embodiment illustrated in FIG. 23B, the screen assembly has a portion of a non-slip surface 1214 that can be held by clamp 1216. The non-slip surface may be teeth or other rough surface made of materials such as plastic, rubber, nylon, etc. In some embodiments, the interior part of side clip 1213 may have a non-slip surface. To release the screen, clamp 1216 may be lifted up and away from the screen and the screen may be free to pull away from the wall. In some embodiments, the screen may be selectively positioned by engaging the clamps against the frame in a desired location. In some embodiments, raising the screen upwards such that it is released from the brackets may be accomplished by lifting the screen up and out from clip 1213.

Figure 24:
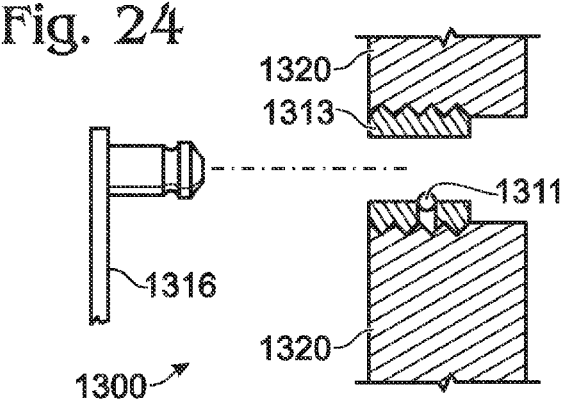
FIG. 24 illustrates an exemplary mechanism to attach a screen assembly to a wall.

A coupler such as bolt, hook, or clamp may be attached to a wall or other surface, thus facilitating screen mounting. In some embodiments, the coupler may be a pin and socket attachment. In the embodiment illustrated in FIG. 24, a threaded insert 1313 may be screwed into wall 1320. Threaded insert 1313 may also include a ball-bearing retention mechanism 1311 or similar device to hold the coupler, such as clamp mechanism 1316 as shown in FIG. 24. It should be appreciated that other couplers may be used to attach the frame to the wall.

Figure 25:
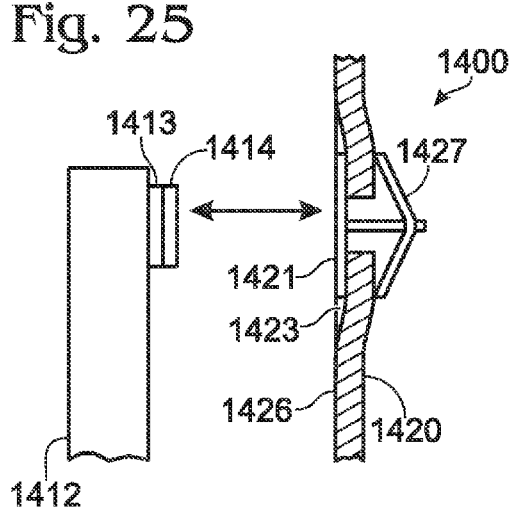
FIG. 25 illustrates an embodiment for attaching a screen assembly to a wall using a magnetic attachment mechanism.

Another mechanism to mount a screen assembly to a wall or other surface is a magnetic attachment 1400 as illustrated in FIG. 25. In some embodiments, screen mounting mechanism 1421 such as a magnetic material (e.g., steel plate) may be inserted into or secured to wall 1420. In some embodiments, the magnetic material 1421 may be covered by paint 1426. Magnetic material clamp 1427 may be used to secure magnetic material 1421 onto the wall. Dry wall mud 1423 may be used to make smooth transition of surface from magnetic material 1421 to wall 1420. The corners or other parts of a screen assembly 1412 may have magnets 1413 so that the screen assembly may be attached to the wall having magnetic material 1421. Optionally, magnets 1413 may include a non-skid, non-marring material 1414 to protect the painted wall and to prevent the screen from slipping down the wall. In another embodiment, magnetic materials may be installed in multiple positions of a wall to accept the same screen. The magnetic attachment mechanism may enable a user to selectively move the screen from one location to another location. The magnetic attachment may be such that the screen mounting mechanism would be substantially invisible after removal of the screen.

Figure 26:
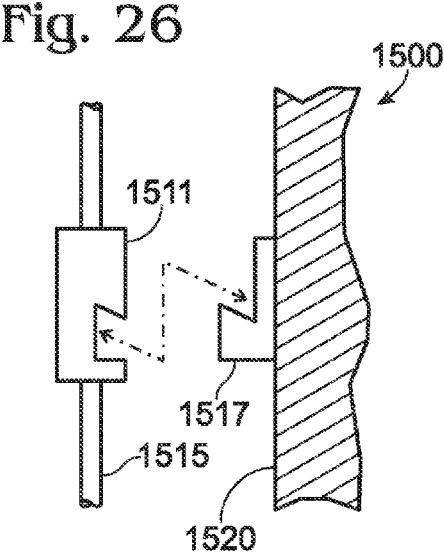
FIG. 26 illustrates an exemplary mechanism that secures a screen assembly to a wall using a mechanical engagement.

In still another embodiment, a center part of a screen assembly may be attached to a wall, a stand or other surface. FIG. 26 illustrates an attachment mechanism 1500 wherein a screen assembly may be secured to wall 1520 through a French cleat or other positive engagement 1517. Although it is shown with a French cleat, it should be noted that other mating configurations or locking configurations may be used. In some embodiments, the engaging part 1511 of a screen assembly may be a hub, and frame components 1515 may be spokes. As another example, the engaging part 1511 may be a gravity center of a screen assembly. Alternatively, multiple engaging parts may be provided on the frame components.

In yet another embodiment using magnetic attachment, a magnet may be disposed in the gravity center of a screen assembly so that the screen assembly may be attached to a wall having magnetic material. For example, a magnet may be disposed in the hub of spokes and hub design so that only the hub is attached to the wall.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein.

Inventions embodied in various combinations and subcombinations of features, functions, elements, and/or properties may be claimed in a related application. Such claims, whether they are directed to a different invention or directed to the same invention, whether different, broader, narrower or equal in scope to any original claims, are also regarded as included within the subject matter of the inventions of the present disclosure.

The invention claimed is:

1. A reconfigurable projection-screen system, comprising:
a flexible screen including a screen perimeter and a viewing region interior the screen perimeter; and
a frame assembly including a plurality of frame members, where at least some of the plurality of frame members include a screen perimeter engaging portion, and where the plurality of frame members are selectively arrangeable in at least an assembled viewing configuration and a disassembled configuration, where in the assembled viewing configuration the screen perimeter engaging portions of the at least some of the plurality of frame members, extend the screen perimeter and hold the viewing region substantially flat, where in the disassembled configuration the screen perimeter engaging portions of the at least some of the plurality of frame members allow the viewing region to fold, where the plurality of frame members includes a plurality of joints and a plurality of elongated spanners, each elongated spanner having a first end and a second end, where each of the first end and the second end of each elongated spanner includes a joint-engaging portion, where the first end of one of the plurality of elongated spanners is tethered to the second end of another of the plurality of elongated spanners, where at least some of the plurality of frame members are resiliently bent and tension the flexible screen when the frame assembly is arranged in the assembled viewing configuration; and where the viewing region comprises a first side and a second side and wherein the plurality of frame members do not overlap or occlude the first side or second side of the viewing region when in the assembled viewing configuration.

2. The reconfigurable projection-screen system of claim 1, where the joint-engaging portion of at least one of the first end and the second end is selectively disengageable with a corresponding joint.

3. The reconfigurable projection-screen system of claim 1, where one of the plurality of joints is integral with the first end of one of the plurality of elongated spanners.

4. The reconfigurable projection-screen system of claim 1, where a stretchable cord tethers the elongated spanners.

5. The reconfigurable projection-screen system of claim 1, where the plurality of frame members includes a hub joint.

6. The reconfigurable projection-screen system of claim 5, where the plurality of elongated spanners radially extend from the hub joint to the screen perimeter when the frame assembly is arranged in the assembled viewing configuration.

7. The reconfigurable projection-screen system of claim 5, where each joint-engaging portion is selectively disengageable with the hub joint.

8. The reconfigurable projection-screen system of claim 5, where the hub joint includes an adjustment mechanism to change an effective length of at least one of the elongated spanners.

9. The reconfigurable projection-screen system of claim 1, where the viewing region is rectangular when the frame assembly is arranged in the assembled viewing configuration.

10. The reconfigurable projection-screen system of claim 9, where the screen perimeter is rectangular when the frame assembly is arranged in the assembled viewing configuration.

11. The reconfigurable projection-screen system of claim 9, where the screen perimeter is nonrectangular when the frame assembly is arranged in the assembled viewing configuration.

12. The reconfigurable projection-screen system of claim 11, where at least some of the plurality of frame members are resiliently bent and tension the flexible screen when the frame assembly is arranged in the assembled viewing configuration.

13. The reconfigurable projection-screen system of claim 1, where in the disassembled configuration the screen perimeter engaging portions of the at least some of the plurality of frame members allow the viewing region to fold in at least two different dimensions.

14. The reconfigurable projection-screen system of claim 1, where each elongated spanner includes a hollow portion, and where the first end of one of the plurality of elongated spanners is tethered to the second end of another of the plurality of elongated spanners with a flexible connector passing through the hollow portion of each of the plurality of elongated spanners.

15. The reconfigurable projection-screen system of claim 1, where at least one joint includes an attachment mechanism for attaching to a wall.

16. The reconfigurable projection-screen system of claim 1, wherein the viewing region is a reflective surface suitable for use with a front projector or a transmissive surface suitable for use with a rear projector.

17. A reconfigurable projection-screen system, comprising:
a frame assembly including:
a plurality of frame-perimeter members, each frame-perimeter member having a first end and a second end, where each of the first end and the second end of each frame-perimeter member includes a joint-engaging portion, and where the first end of one of the plurality of frame-perimeter members is tethered to the second end of another of the plurality of frame-perimeter members; and
a plurality of joints, each joint to selectively hold at least two of the frame-perimeter members in a fixed orientation relative to one another, where each joint allows selective disassembly of the at least two frame-perimeter members; and
a screen surface connectable to the frame assembly, where the frame assembly extends the screen surface substantially flat when the plurality of joints hold the plurality of frame-perimeter members in the fixed orientation and the screen surface is connected to the frame assembly, where the frame assembly allows the screen surface to fold when the frame-perimeter members are disassembled, where at least some of the plurality of frame-perimeter members are resiliently bent and tension the screen surface when the plurality of joints hold the plurality of frame-perimeter members in the fixed orientation and the screen surface is connected to the frame assembly, and where the screen surface comprises a first side and a second side and wherein the plurality of frame-perimeter members do not overlap or occlude the first side or second side of the screen surface when the frame assembly extends the screen substantially flat.

18. The reconfigurable projection-screen system of claim 17, where the screen surface is permanently connected to the frame assembly.

19. The reconfigurable projection-screen system of claim 17, where the screen surface is selectively connected to the frame assembly.

20. The reconfigurable projection-screen system of claim 17, wherein the screen surface is a reflective surface suitable for use with a front projector or a transmissive surface suitable for use with a rear projector.

21. The reconfigurable projection-screen system of claim 17, wherein the screen surface comprises a first side and a second side and wherein the plurality of frame-perimeters members do not overlap or occlude the first side or second side of the screen surface when the plurality of joints hold the plurality of frame-perimeter members in the fixed orientation and the screen surface is connected to the frame assembly.

22. A reconfigurable projection-screen system, comprising:
 a flexible screen including a screen perimeter and a viewing region interior the screen perimeter; and
 a frame assembly including a plurality of frame members, where the plurality of frame members are selectively arrangeable in at least an assembled viewing configuration and a disassembled configuration, where in the assembled viewing configuration the viewing region is held substantially flat, where in the disassembled configuration the viewing region is configured to fold, where the plurality of frame members includes a plurality of joints and a plurality of elongated spanners, each elongated spanner having a first end and a second end, where each of the first end and the second end of each elongated spanner includes a joint-engaging portion, where the first end of one of the plurality of elongated spanners is tethered to the second end of another of the plurality of elongated spanners, where at least some of the plurality of frame members are resiliently bent and tension the flexible screen when the frame assembly is arranged in the assembled viewing configuration; and where the viewing region comprises a first side and a second side and wherein the plurality of frame members do not overlap or occlude the first side or second side of the viewing region when in the assembled viewing configuration.

23. The reconfigurable projection-screen system of claim 22, wherein the viewing region is a reflective surface suitable for use with a front projector or a transmissive surface suitable for use with a rear projector.

* * * * *